April 8, 1958

H. M. RUSH 2,829,901

PLATFORM LEVELING SYSTEM

Filed May 9, 1956

INVENTOR.
Hugh M. Rush
BY
Agent

April 8, 1958

H. M. RUSH 2,829,901

PLATFORM LEVELING SYSTEM

Filed May 9, 1956

INVENTOR.
Hugh M. Rush
BY
Oliver D. Olson
Agent

United States Patent Office 2,829,901
Patented Apr. 8, 1958

2,829,901

PLATFORM LEVELING SYSTEM

Hugh M. Rush, Elkhart, Ind.

Application May 9, 1956, Serial No. 583,791

6 Claims. (Cl. 280—6)

This invention pertains to leveling systems, and relates particularly to a novel system by which to level a supported platform or the like when situated upon uneven or inclined surfaces.

There are many and diverse types of apparatus which depend for proper function upon being supported in a horizontal plane. Among such apparatus are included loading cranes, personnel supporting booms and many others. These types of apparatus generally are mobile, being formed integral with or as attachments to trucks and other vehicles. In the base of personnel supporting booms, for example, it is desirable that the boom supporting turntable be arranged preliminarily in a horizontal plane in order that movements of the personnel support may be related properly to horizontal and vertical planes.

It is a principal object of the present invention to provide a leveling system by which to adjust a platform relative to its underlying support.

Another important object of this invention is to provide for a mobile vehicle having a spring-supported platform, a leveling system by which to level said platform transversely of the vehicle when the wheels of the vehicle rest upon an uneven or inclined surface.

A further important object of the present invention is to provide for mobile vehicles having a spring-supported platform, a leveling system by which to lock out temporarily the action of said springs.

Still another important object of the present invention is the provision of a leveling system by means of which a detachable platform may be mounted upon a vehicle and adjusted to horizontal position with speed and facility.

The foregoing and other objects and advantages of the present invention will appear from the following detailed description, taken in connection with the accompanying drawings, in which.

Figure 1:
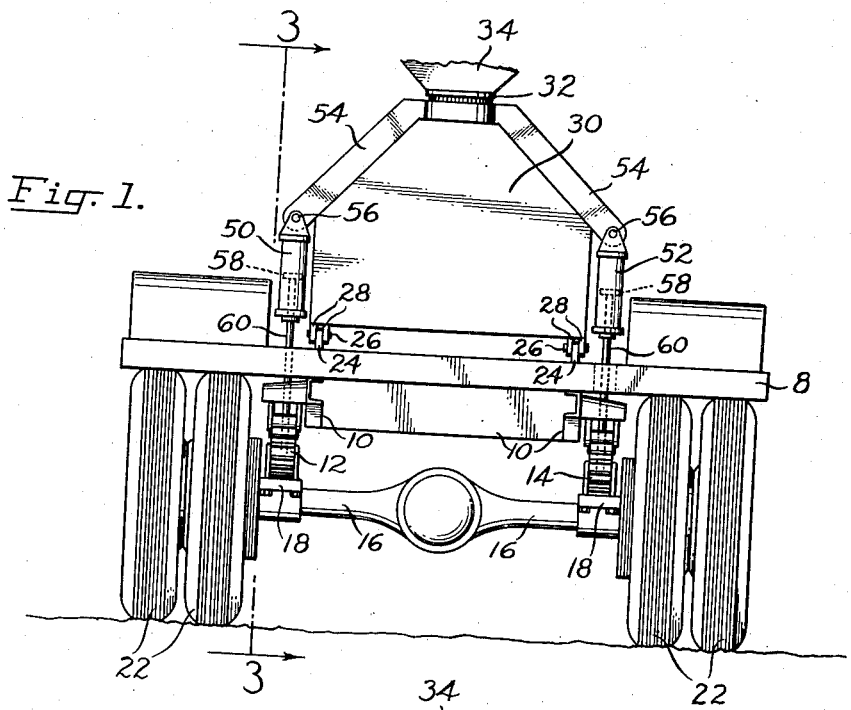
Figure 1 is a rear elevation of a truck having a boom support mounted thereon by means of a leveling system embodying the features of the present invention, the leveling system being shown in unlocked position with the truck travelling on a level road.

The leveling system of the present invention is illustrated in the drawings in association with a truck having a flatbed 8 mounted upon a frame 10. The frame is supported resiliently upon front and rear axle and wheel assemblies, the rear assembly only being shown in the drawings. Thus, leaf springs 12 and 14 are secured pivotally at their opposite ends to the side members of frame 10. An axle housing 16 extends transversely of the frame and is secured adjacent its ends to the springs intermediate the ends of the latch by means of the clamps 18. Mounted within the housing 16 are axles 20 which support ground engaging wheels 22, in the usual manner.

Secured to the truck bed 8 vertically above the axles 20 are a pair of laterally spaced upstanding brackets 24. To these brackets are pivotally secured, as by the pivot pins 26, the depending ears 28 which project downwardly from the lateral ends of an upstanding base member, preferably constructed in the form of a hollow housing 30.

In the embodiment illustrated, a turntable 32 is mounted in the top of housing 30 and is driven by a turntable motor contained within said housing. The turntable functions to support a boom 34, or other device.

The housing 30 is supported in upright position by means of a brace which, as illustrated, preferably is adjustable in length and is power driven. Thus, the brace includes an elongated cylinder 36 which is pivotally secured at one end to the truck paltform 8 by such means as the upstanding bracket 38 and pivot pin 40. The cylinder contains a piston 42 attached to a piston rod 44 which extends outwardly from the cylinder and is pivotally connected at its terminal end to the housing 30 by such means as the bracket 46 and pivot pin 48.

The leveling assembly for adjusting the truck bed 8 and turntable 32 to horizontal position in the transverse directions of the truck comprises, in the embodiment illustrated, a pair of fluid pressure cylinders 50, 52 which are pivotally secured at their upper ends to outwardly projecting brackets 54 secured to the housing 30. These pivot connections are made by such means as pivot pins 56. The cylinders 50, 52 depend downwardly, and each contains a piston 58 which is attached to a piston rod 60. The piston rods project downwardly from the cylinder through openings in the bed 8 and are pivotally connected at their lower terminal ends to the spring brackets 18, as by means of pivot pins 62. Thus, the rods 60 of the cylinders 50, 52 are effectively anchored to the axle housing 16 and hence are fixed with respect to the axles 20 and wheels 22.

Figure 4:
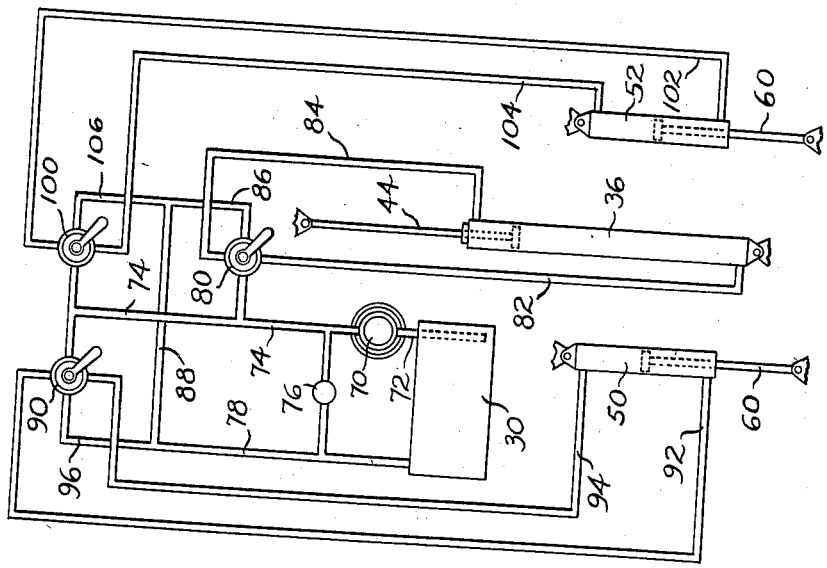
Figure 4 is a schematic diagram of a fluid pressure system by which to operate the leveling system of the present invention.

As previously mentioned, the leveling system illustrated in the drawings is chosen to utilize fluid pressure as the source of power. Referring now to Figure 4 of the drawings, there is shown a diagram of a preferred form of fluid system for the cylinders 36, 50 and 52. In the preferred embodiment the source of fluid pressure is hydraulic fluid, and a supply thereof is conveniently stored in the hollow housing 30 which serves as a reservoir therefor. A hydraulic pump 70 draws the fluid from the reservoir 30 through pipe 72, and the pressurized fluid is then fed from the pump to a high pressure distributing line 74. A fluid pressure regulating valve 76 interconnects the high pressure line 74 and the return line 78 to the reservoir 30.

It will be understood that the motor 70 may be mounted upon the truck bed 8 in any convenient position for attachment to a power take-off of the truck motor.

The high pressure line 74 is connected to a four-way valve 80. This valve is also connected to opposite ends of the hydraulic cylinder 36 by means of conduits 82 and 84, and also to the return line 78 by means of conduits 86 and 88.

Similarly, the high pressure line 74 is connected to a second four-way valve 90, which is connected to opposite ends of the hydraulic cylinder 50 by means of conduits 92 and 94. Valve 90 is also connected to the return line 78 by means of conduit 96.

A third four-way valve 100 is connected to the high pressure line 74 and also to the opposite ends of hydraulic cylinder 52 by means of conduits 102 and 104. Valve 100 is also connected to the return line 78 by means of conduits 106 and 88.

Although the valves 80, 90 and 100 may be mounted at any desired position, they are shown, for convenience, mounted on the forward panel of the housing 30. It will be understood that the conduits leading from these valves are of the flexible type to permit movement of the power assemblies and housing.

In one position of adjustment of valve 80, the high pressure line 74 communicates directly with conduit 82 to supply fluid pressure to the cylinder 36 in such manner as to extend the piston rod 44. In this position of adjustment, valve 80 also interconnects conduits 84, 86 to exhaust the opposite end of cylinder 36 to the reservoir 30. In a second position of adjustment of valve 80, the aforementioned connections are reversed, i. e. the high pressure line 74 communicates directly with conduit 84 to supply fluid pressure to the cylinder 36 in the direction to retract piston rod 44, conduits 82 and 86 being interconnected to exhaust the opposite end of cylinder 36 to the reservoir 30. In a third position of adjustment of valve 80, the conduits 82 and 84 are sealed off, thereby securing the piston rod 44 in a fixed position of adjustment. In this position of the valve, the high pressure line 74 is exhausted to the reservoir through conduits 86, 88 and 78.

In one position of adjustment of valve 90, conduits 92 and 94 are interconnected to permit free passage of fluid therethrough to the opposite ends of cylinder 50. A similar position of valve 100 interconnects the conduits 102 and 104 to permit free passage of fluid between the opposite ends of cylinder 52. This position of each of the valves 90 and 100 is maintained during normal travel of the truck, in order to permit normal action of the springs 12, 14.

In a second position of valve 90, the high pressure line 74 communicates directly with conduit 92 to supply fluid pressure to the cylinder 50 in the direction to retract the associated piston rod 60. In this position of the valve, the cylinder 50 is exhausted through conduits 94, 96 and 78 to the reservoir 30. In a third position of valve 90, the high pressure line 74 communicates directly with conduit 94 to supply fluid pressure to the cylinder 50 in the direction to extent the associated piston rod 60, the cylinder being exhausted through conduits 92, 96 and 78 to the reservoir 30.

Similarly, a second position of valve 100 provides connection between the high pressure line 74 and conduit 102 to supply fluid pressure to cylinder 52 in the direction to retract the associated piston rod 60, the cylinder being exhausted through conduits 104, 106, 88 and 78 to the reservoir 30. In a third position of valve 100 the high pressure line 74 communicates directly with conduit 104 to supply fluid pressure to cylinder 52 in the direction to extend the associated piston rod 60, the cylinder being exhausted through conduits 102, 106, 88 and 78, back to the reservoir 30.

In a fourth position of adjustment of valve 90, the conduits 92 and 94 are sealed off, thereby securing the piston rod of cylinder 50 in a fixed position of adjustment. This fourth position of valve 90 also interconnects the high pressure line 74 and the exhaust conduits 96 and 78. A similar fourth position is provided for valve 100, wherein conduits 102 and 104 are sealed off and the high pressure line 74 is exhausted to reservoir 30 through conduits 106, 88 and 78.

Figure 3:
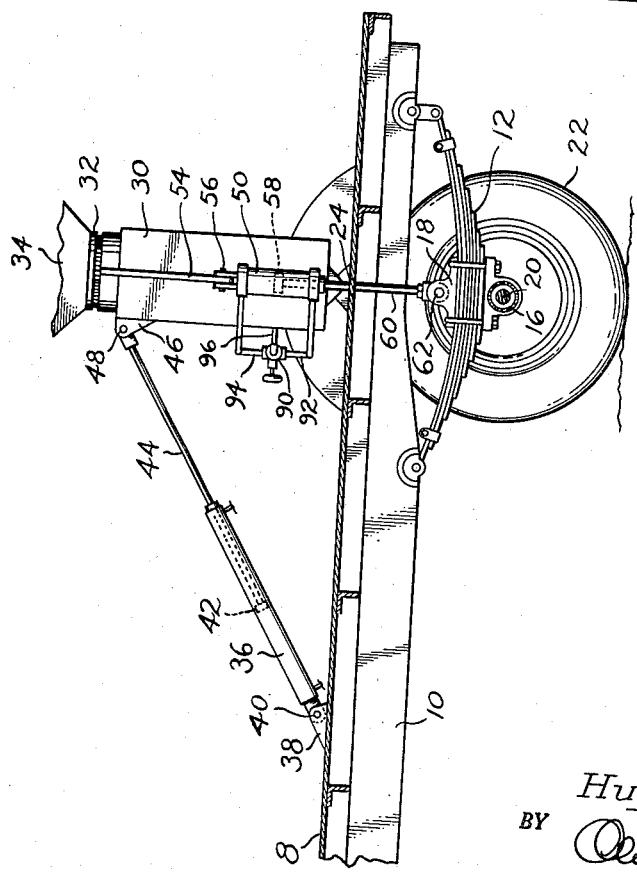
Figure 3 is a fragmentary sectional view taken along the line 3—3 in Figure 1.

The operation of the assembly described hereinbefore will now be explained. First, let it be assumed that a boom assembly 34 is to be transported on a truck to a site of operation. Accordingly, the boom assembly is supported in retracted position and the housing 30 is held rigidly in the vertical position shown in Figure 3 by proper adjustment of valve 80, as explained hereinbefore. Valves 90 and 100 are adjusted to the first position explained hereinbefore in which the conduits 92, 94 and 102, 104, respectively, are interconnected to permit free passage of fluid between the opposite ends of the cylinders 50 and 52. In this position of the valves 90 and 100, the pistons 58 in the cylinders 50 and 52 are permitted to move freely, thus affording unrestricted action of the springs 12 and 14 and permitting the truck to travel under normal conditions.

Figure 2:
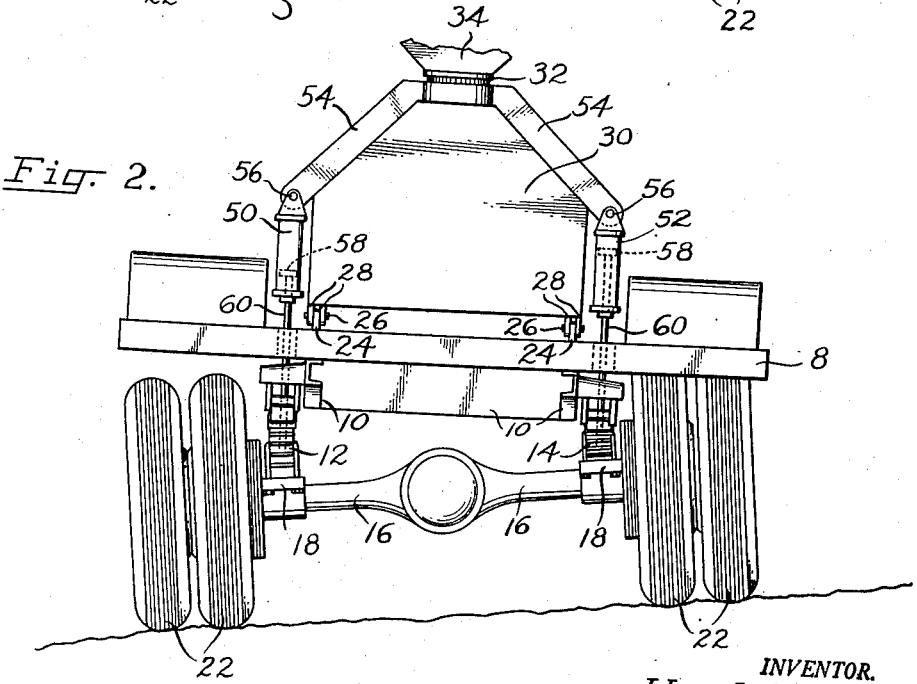
Figure 2 is a rear elevation of the truck and leveling assembly shown in Figure 1, the truck being shown resting upon an inclined surface and the leveling system arranged in locked position with the truck bed and turntable adjusted to horizontal position.

Let it now be assumed that the site of operation of the boom assembly is as shown in Figure 2, wherein the terrain upon which the wheels 22 of the truck rest is inclined. Thus, in order to bring the truck bed 8 and the turntable 32 to horizontal position in the transverse direction of the truck, the hydraulic motor 70 is energized and valve 90 moved to the position in which the high pressure line 74 communicates directly with conduit 94, and conduit 92 is exhausted to the reservoir 30 through conduit 96. In this manner, fluid pressure is fed to the top end of cylinder 50, causing extension of the piston rod 60 associated therewith. Thus, the left side of the truck bed 8 (Figure 2) is elevated. When the truck bed and turntable have been leveled transversely of the truck, valve 90 is moved to the position in which the conduits 92 and 94 are sealed. Valve 100 is then moved to the position in which the conduits 102 and 104 also are sealed.

It will be apparent that when the cylinders 50 and 52 are in the locked position just described, the axle housing 16 and axles of the truck are secured firmly in the angular relation with respect to the truck bed 8 illustrated in Figure 2. This is achieved by virtue of the direct structural connection between the axle housing 16, the piston rods 60 and cylinders 50, 52, pivot connections 56 and housing 30, and its pivot connections 26 to the truck bed 8. Thus, the springs 12, 14 are effectively locked out of action and therefore the horizontal position of the truck bed 8 or turntable 32 cannot be altered even though changes in center of gravity occur as the boom assembly is shifted to various positions laterally of the truck.

It will be understood that in the event the truck is positioned upon a longitudinal incline, as well as the lateral incline illustrated in Figure 2, adjustment of the turntable to horizontal position in a longitudinal direction of the truck may be achieved by proper manipulation of valve 80 to operate the cylinder 36 and piston rod 44 and bring the housing 30 into vertical position.

In many instances a boom or other device may be mounted directly upon the flatbed 8 or frame 10 of a truck, or other support, rather than upon a turntable assembly such as is illustrated herein. Since the transverse leveling cylinders 50, 52 function to level the truck bed and frame, as well as the turntable 32, in the transverse direction of the truck, the assembly of housing 30 and turntable 32 may be dispensed with or otherwise modified, as desired. In such event, it is required only that means be provided on the truck bed or frame for pivotally mounting the upper ends of the cylinders 50, 52. The housing 30 or other form of base member may provide this means.

It will be apparent to those skilled in the art that various other modifications and changes in the details of construction described hereinbefore may be made without departing from the scope and spirit of this invention. For example, the extensible cylinder and rod assemblies may be reversed end for end, and they may be actuated by other forms of fluid pressure, such as compressed air and other gases and liquids. Mechanical power means may also be employed, provided they accommodate unrestricted spring action during normal travel of the vehicle.

Since the foregoing and other modfications and changes may be made, as desired, it is to be understood that the foregoing description is primarily illustrative of the invention and is not to be considered as limiting the scope thereof.

Having now described my invention and the manner in which the same may be used, what I claim as new and desire to secure by Letters Patent is:

1. A leveling system for boom supports and the like adapted to be supported by a platform mounted upon spaced supports for movement vertically with respect to said supports, said leveling system comprising a base member mounted on the platform for pivotal movement on an axis substantially parallel to the axis of said platform supports, the base member serving as a support for a boom or the like, spaced extensible power means pivotally interconnecting the base member and the supports of the platform for adjusting the vertical spacing between said supports and platform, and third independent extensible power means pivotally interconnecting the platform and base member for pivoting the latter on its pivot axis.

2. The system of claim 1 wherein the base member is hollow and is adapted to contain hydraulic fluid, each power means comprises an extensible hydraulic fluid cylinder and piston rod assembly, and pump means interconnecting each power means and the base member for supplying said hydraulic fluid to each power means.

3. A leveling system for boom supports and the like adapted to be supported by a vehicle platform mounted upon laterally spaced wheels for movement vertically with respect to said wheels, said leveling system comprising a base member mounted on the platform for pivotal movement on an axis substantially parallel to the axis of said wheels, the base member serving as a support for a boom or the like, laterally spaced extensible power means pivotally interconnecting the base member and the wheels of the platform for adjusting the vertical spacing between said wheels and platform, each power means being arranged in one position to be freely extensible and retractable to permit unrestricted changing of the vertical spacing between said wheels and platform, and in another position to be secured in a fixed position of extension to maintain a selected vertical spacing between said wheels and platform, and third independent extensible power means pivotally interconnecting the platform and base member for pivoting the latter on its pivot axis.

4. The system of claim 3 wherein each power means comprises an extensible fluid pressure cylinder and piston rod assembly and a source of fluid pressure therefor, and adjustable valve means associated with each of the laterally spaced power means and arranged in one position of adjustment to permit free extension and retraction of the power means, and in another position of adjustment to secure the power means in a fixed position of extension.

5. The system of claim 3 wherein the base member is hollow and is adapted to contain hydraulic fluid, each power means comprises an extensible hydraulic fluid cylinder and piston rod assembly, pump means interconnecting each power means and the base member for supplying said hydraulic fluid to each power means, and adjustable valve means associated with each of the laterally spaced power means and arranged in one position of adjustment to permit free extension and retraction of the power means, and in another position of adjustment to secure the power means in a fixed position of extension.

6. A leveling system for boom supports and the like adapted to be supported by a vehicle platform mounted resiliently upon laterally spaced wheels by interposed spring means for movement vertically with respect to said wheels, said leveling system comprising a hollow base member adapted to contain hydraulic fluid and mounted on the platform for pivotal movement on an axis substantially parallel to the axis of said wheels, the base member serving as a support for a boom or the like, laterally spaced extensible power means pivotally interconnecting the base member and the wheels of the platform for adjusting the vertical spacing between said wheels and platform, each power means comprising an extensible hydraulic fluid cylinder and piston rod assembly, pump means interconnecting each power means and the base member for supplying said hydraulic fluid to each power means, and adjustable valve means associated with each of the laterally spaced power means and arranged in one position of adjustment to permit normal action of the spring means, and in another position of adjustment to secure the power means in a fixed position of extension.

References Cited in the file of this patent

UNITED STATES PATENTS

| | | |
|---|---|---|
| 2,472,944 | Furer et al. | June 14, 1949 |
| 2,545,493 | Richter | Mar. 20, 1951 |
| 2,545,494 | Richter | Mar. 20, 1951 |
| 2,676,783 | Rogers | Apr. 27, 1954 |